US00RE35605E

United States Patent [19]

Nomaru et al.

[11] E Patent Number: Re. 35,605

[45] Reissued Date of Patent: Sep. 16, 1997

[54] WORK POSITIONING DEVICE FOR ASSEMBLY LINE

[75] Inventors: Minoru Nomaru, Yokohama; Atsushi Takahama, Yokosuka, both of Japan

[73] Assignee: Nissan Motor Co., Ltd., Yokohama, Japan

[21] Appl. No.: 902,223

[22] Filed: Jun. 22, 1992

Related U.S. Patent Documents

Reissue of:

[64] Patent No.: 4,976,484
Issued: Dec. 11, 1990
Appl. No.: 282,158
Filed: Dec. 9, 1988

[30] Foreign Application Priority Data

Dec. 10, 1987 [JP] Japan ..... 62-187091

[51] Int. Cl.[6] ..... B25J 15/08

[52] U.S. Cl. ..... 294/119.1; 269/71; 269/242; 414/729; 414/589; 294/902; 901/16; 901/35; 901/39

[58] Field of Search ..... 901/16, 31, 39, 901/35, 46; 414/729, 741, 589; 294/86.4, 119.1, 902, 907; 269/69, 70, 71, 73, 242

[56] References Cited

U.S. PATENT DOCUMENTS

| | | | |
|---|---|---|---|
| 3,438,510 | 4/1969 | Fawell | 294/119.1 X |
| 3,606,162 | 9/1971 | Lehmann | 901/16 X |
| 3,655,232 | 4/1972 | Martelee | 294/119.1 X |
| 4,399,639 | 8/1983 | Lessway | 294/119.1 X |
| 4,479,673 | 10/1984 | Inaba et al. | 294/119.1 X |
| 4,571,149 | 2/1986 | Soroka et al. | 901/16 X |
| 4,579,380 | 4/1986 | Zaremsky et al. | 294/119.1 |
| 4,583,909 | 4/1986 | Yamashira et al. | 901/16 X |
| 4,627,785 | 12/1986 | Monforte | 294/907 X |
| 4,653,794 | 3/1987 | Atlas | 294/119.1 X |
| 4,696,503 | 9/1987 | Collodel | 294/119.1 X |
| 4,699,414 | 10/1987 | Jones | 294/119.1 |
| 4,707,013 | 11/1987 | Vranish et al. | 294/119.1 |
| 4,750,769 | 6/1988 | Tebb | 294/86.4 |
| 4,810,018 | 3/1989 | van de Ven et al. | 294/86.4 X |
| 4,822,091 | 4/1989 | Vermeer et al. | 294/119.1 X |
| 4,878,705 | 11/1989 | Arnquist | 294/907 X |

FOREIGN PATENT DOCUMENTS

| | | | |
|---|---|---|---|
| 0149429A | 7/1985 | European Pat. Off. | 269/73 |
| 1141181 | 2/1985 | U.S.S.R. | 294/119.1 |
| 2120202 | 11/1983 | United Kingdom . | |

*Primary Examiner*—David A. Bucci
*Assistant Examiner*—James Eller
*Attorney, Agent, or Firm*—Pennie & Edmonds

[57] ABSTRACT

A work piece support device features two pincer members which can be moved toward and away from each other and which can be varied in length in manner to accommodate different shaped work pieces. The device is mounted on a manipulator which selectively displace the same in three mutually opposed directions. Location and locking probes can be used in combination with the support device to locate and/or lock the work piece in place.

4 Claims, 9 Drawing Sheets

WORK POSITIONING DEVICE FOR ASSEMBLY LINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a work positioning device for use on a production line or the like and more specifically to work a positioning device or manipulator which can be adjusted in a manner which allows a large variety of different work pieces to be accurately supported and/or secured in predetermined positions.

2. Description of the Prior Art

FIGS. 1 and 2 show a previously proposed device which is capable of moving a plurality of work pieces to a predetermined position. This arrangement consists of support bracket 1 on which a rotatable member 2 is mounted. The rotatable member 2 includes a plurality of radially extending gauge plates 3a–3e. The support bracket 1 is further provided with an actuator 4 which is operatively connected with the rotatable member 2 in a manner wherein the latter can be selectively rotate and selectively move the gauge plates 3a–3e to new positions.

Each of the gauge plates is provided with a pinch lever type clamp 5 and an actuator 6 which is arranged to operatively connected with the clamp in a manner which enables the same to be selectively motivated. In this arrangement the actuators 6 are connected with the clamps 5 by way of linkage mechanism 7.

With this arrangement appropriate operation of the actuator 4 permit the gauge plates to be rotated in a manner to bring the desired one into a working position. In this case the working position is one wherein the gauge plate assumes the essentially vertical position denoted "0" in FIG. 1.

Operation of the actuator 6 induces the clamp to be moved into a position wherein a work piece is secured in position.

As it is necessary to be able to enable the adjustments in three dimensions, a manipulator arrangement generally denoted by the numeral 10 operatively connected to the lower end of the support bracket 1. In this instance the manipulator 10 includes a base 8 which can be moved along a first axis. A motor 9 is arranged to enable the manipulator to be moved along a second axis which is arranged normally to the one along which the base is movable. In addition to this a knee joint-like arrangement is provided with motors 11, 12 and 13 which allows the height of the mounting bracket 1 to be selectively changed.

However, with this arrangement as the number of gauge plates is limited, it is necessary to change the same from time to time in order to permit different work pieces to be appropriately supported. This apart from being troublesome consumes valuable working time.

For further disclosure relating to the above described arrangement reference can be had to U.S. Pat. No. 4,691,905 issued on Sep. 8, 1987 in the name of Tamura et al and which is assigned to the same entity as the instant application.

SUMMARY OF THE INVENTION

An object of the present invention is to provide an arrangement which can support a large variety of different work pieces and which can be rapidly adjusted to the appropriate clamping configuration and easily moved to the appropriate supporting position.

In brief, the above objects are achieved by an arrangement wherein which features two pincer members which can be moved toward and away from each other and which can be varied in length in manner to accommodate different shaped work pieces. The device is mounted on a manipulator which selectively displace the same in three mutually opposed directions. Location and locking probes can be used in combination with the support device to locate and/or lock the work piece in place.

More specifically, the present invention is deemed to comprise a device for supporting a work piece which features: first and second pincer members, said first and second pincer members being disposed on a base member in a manner to be slidably movable toward and away from each other, the first pincer being elongatable; and first and second work receiving members, said first and second work receiving members being disposed at the upper ends of said first and second members; first drive means associated with said first and second pincers for moving said first and second pincers toward and away from one another, said first drive means including a device which converts rotational motion into linear motion, and second drive means associated with said first pincer for selectively elongating the same.

A further aspect of the present invention is deemed to comprise the above mentioned device being supported on a manipulator which features: a base member; a first plate member, said first plate member being supported on said base member in a manner wherein it is movable along a first axis relative to the base member; a second plate member, said second plate member being supported on said first plate member in a manner wherein it is movable along a second axis relative to said base member; a post member, said post member being supported on second plate member in a manner to be movable along a third axis, said third axis extending essentially normally to said second plate member; first, second and third translation devices, said first second and third translation devices being arranged to convert rotational motion into linear motion; motor means, said motor means including an encoder, said encoder being disposed with said motor means and arranged to produce pulses indicative of the rotational energy produced by the same.

DETAILED DESCRIPTION OF THE PREFERRED EMBODIMENTS

Figure 1:
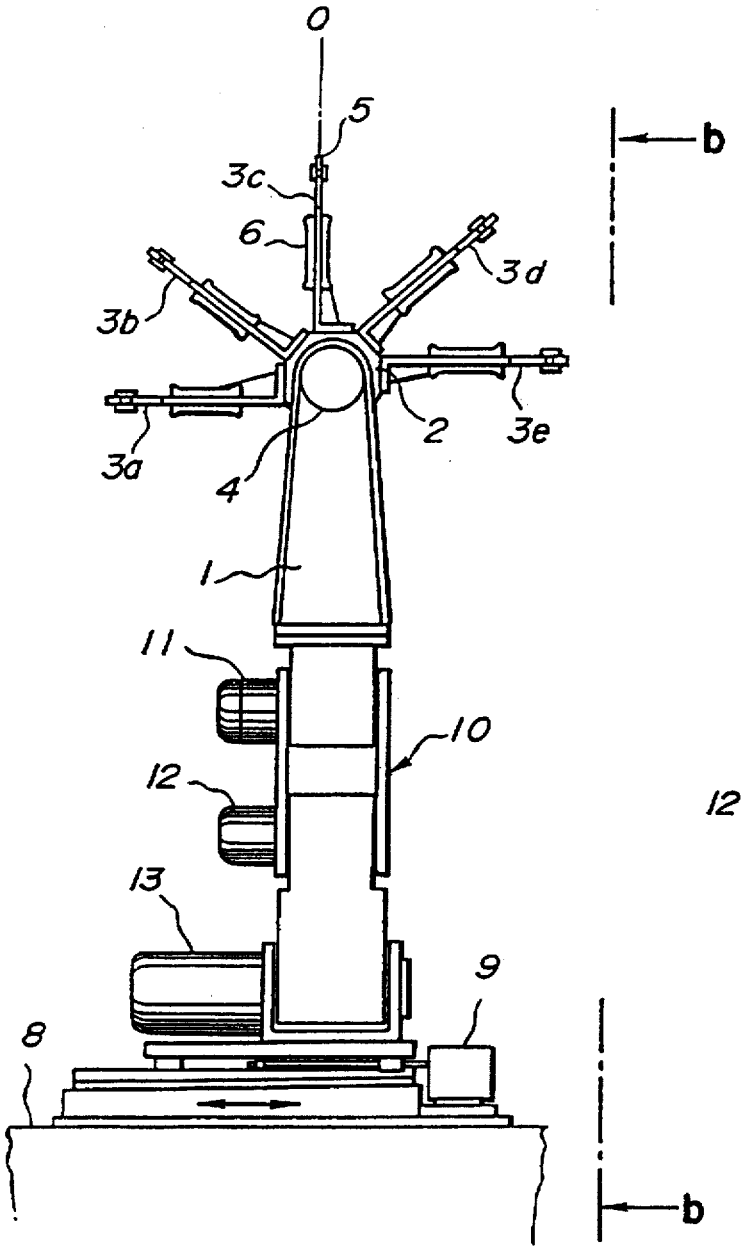
FIG. 1 and 2 shows the prior art arrangement discussed in the opening paragraphs of the instant disclosure.
Figure 2:
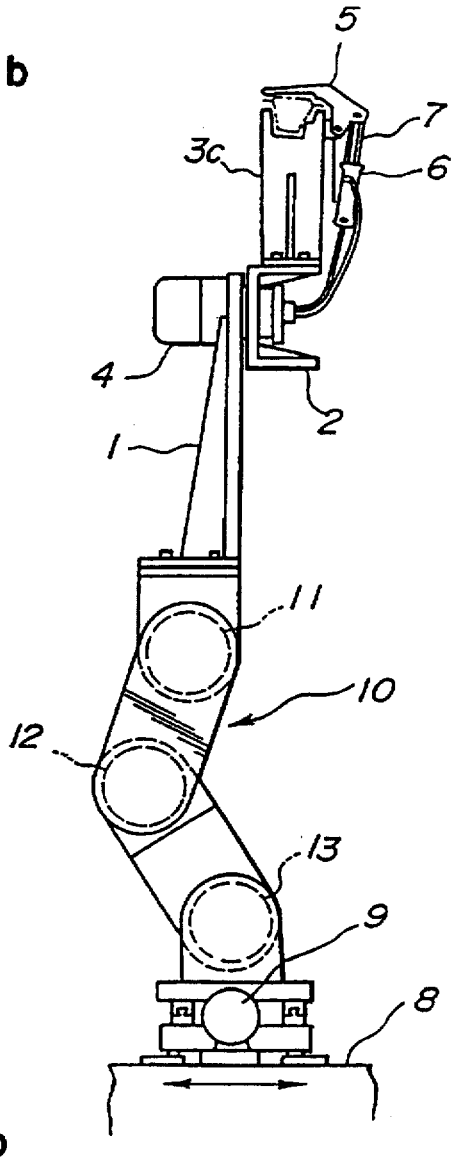
Figure 3:
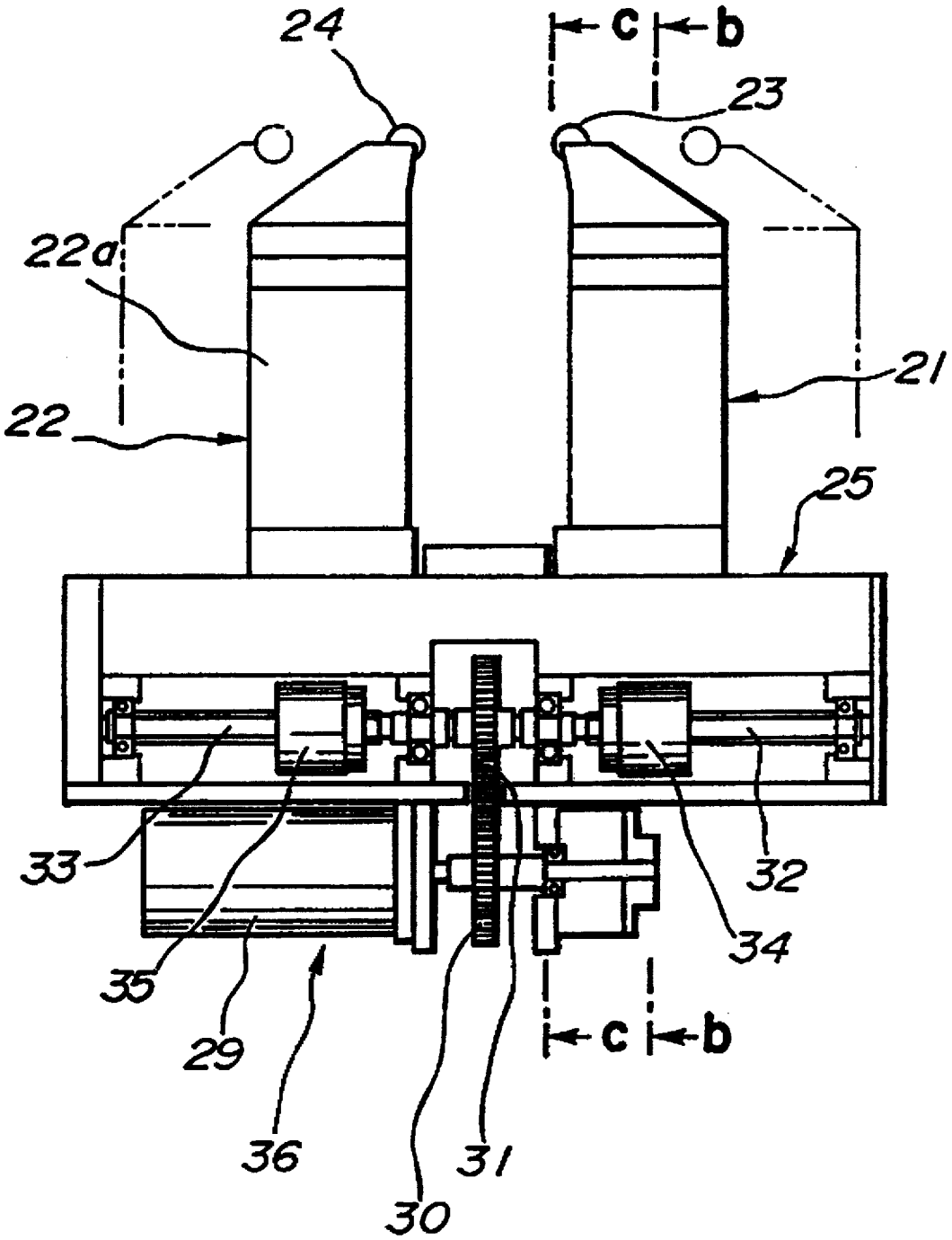
FIG. 3 is a elevational view of an arrangement which characterizes a first embodiment of the present invention.

FIG. 3 shows a first embodiment of the present invention. In this arrangement two finger-like clamping pincer members 21 and 22 are supported on a frame 25 in a manner to be movable toward and away from one another. Spherical or cylindrical shaped support members 23, 24 are mounted on upper ends of the pincers 21 and 22 (as they will be referred to hereinafter).

It should be noted however, that the shape and orientation of these members and the material from which they are formed may be varied widely depending on the shape and type of work piece that is required to be supported, without departing from the scope of the present invention.

Figure 4:
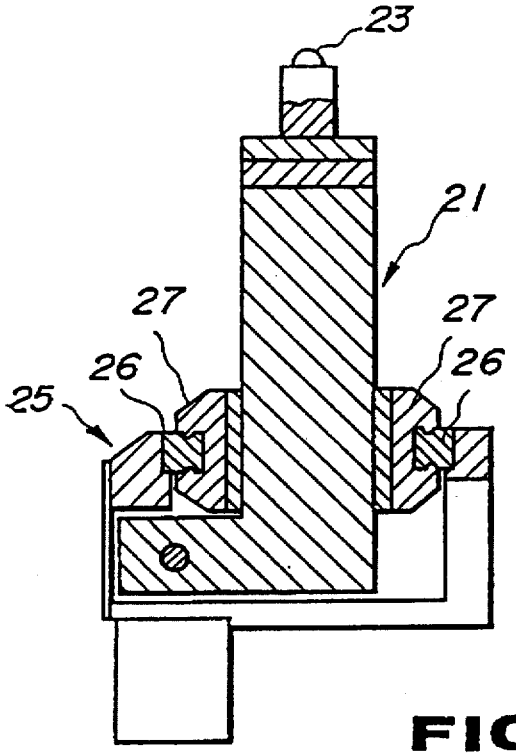
FIG. 4 is a sectional elevation taken along section line b—b of FIG. 3.
Figure 5:
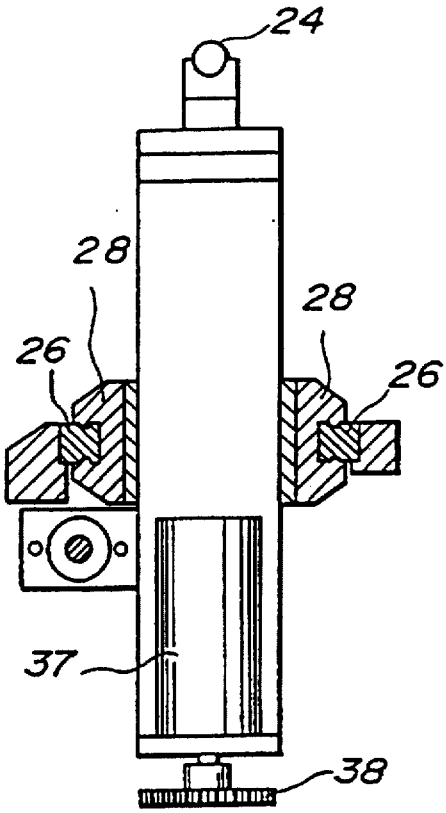
FIG. 5 is a sectional view taken along section line c—c of FIG. 3.
Figure 6:
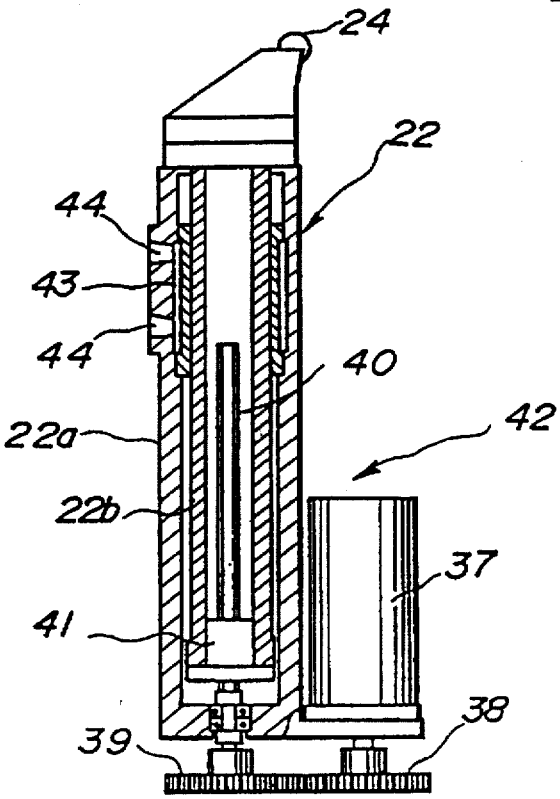
FIG. 6 is a sectional elevation showing the mechanism which allows each of the height of each of the pincers to be selectively adjusted.

The pincers 21 and 22 are provided with guides 27, 28 (see FIGS. 4 and 5) which are slidably supported by guide members 26. As shown, the guide members 26 are fixedly secured to the frame 25 in a manner to extend laterally inward toward the pincers.

A motor 29 is supported on the underside of the frame 25 and operatively connected with the pincers 21, 22 by way of drive mechanisms which includes a drive gear 30 which is mounted on the output shaft of the motor 29, a driven gear 31 disposed in meshing engagement with the driving gear 30, first and second feed shafts 32, 33 which are provided with an external thread and which are fixedly connected to the driven gear 31 for synchronous rotation therewith, first and second internally threaded followers 34, 35 which are respectively received on the feed shafts 32, 33 in a manner to under linear motion in response to the rotation of the shafts.

The lead angle of the threads on the feed shafts 32, 33 are arranged in opposite directions so that depending on the direction of rotation of the feed shafts the internally threaded followers 34, 35 are moved either toward or away from one another. The internally threaded followers 34 and 35 are operatively connected with the pincers whereby the motor and associated drive mechanism defines enables the pincers 21, 22 to be opened and closed (viz., slid along the guides 26 away from and toward each other, respectively).

One or preferably both of the pincers 21, 22 are arranged to be telescopically elongatable (viz., telescopical in a manner which permits the vertical displacement of the work supporting sections of the same). In this instance each pincers comprises a fixed housing 22a (discussion will be limited to pincer 22 for simplicity) which as a motor 37 connected to the external surface thereof. A hollow movable member 22b on which the work supporting members 23, 24 of each of the pincers are disposed, is reciprocatively disposed in the outer housing 22a. The lower end of member 22 is provide with an internally threaded nut 41 which is fixedly secured in the illustrated position. A feed shaft 40 is rotatably mounted in the fixed housing 22a by way of roller bearing or the like (no numeral). The internally threaded nut 41 is operatively disposed on the feedshaft 40 in a manner wherein, depending on the direction of rotation of the shaft, the nut 41 is arranged to move up or down along the shaft. The motor 37 is connected with the feed shaft 40 by way of meshing gears 38, 39 in a manner which establishes a drive connection therebetween.

In order to securely lock each pincer in a predetermined extended position, a brake device is provided. In this instance the brake includes a clamping sleeve 43 which is fixedly connected to the inner wall of the fixed housing 22a in a manner to define an annular chamber (no numeral). Ports 44 formed in the fixed housing 22a permit the supply of hydraulic fluid into the annular chamber defined between the sleeves and the fixed housing 22a. When hydraulic fluid under pressure is supplied into the annular chamber the sleeve flexes and secures the hollow movable member 22b in whatever position it happens to be set in.

Figure 7:
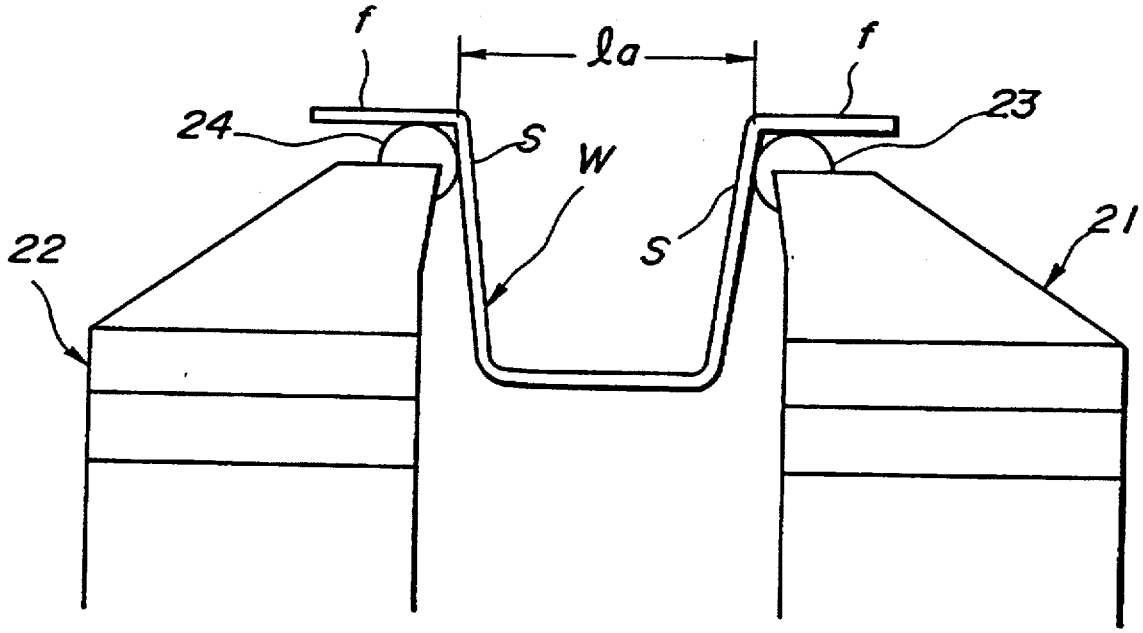
FIG. 7 is a elevational view showing a work piece having a channel type cross-section being supported by the finger arrangement according to the present invention.

With the above description arrangement when the work piece W includes a flanged channel section the pincers can be separated to the width of the channel section in the manner illustrated in FIG. 7 wherein the work support members 23, 24 engage the sides s of the channel section and lower faces of the flanges f.

Figure 8:
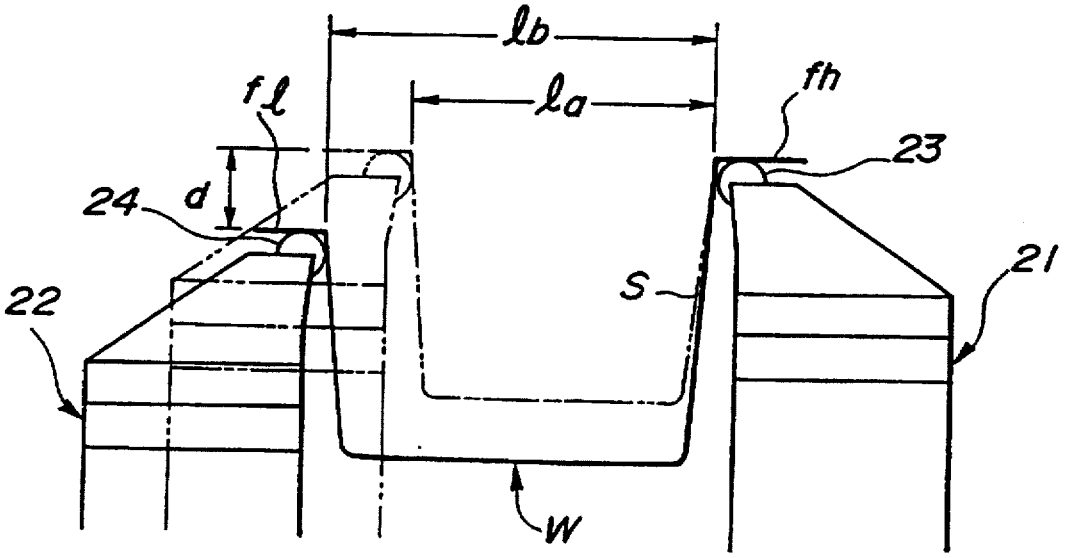
FIG. 8 shows an example of how the finger arrangement according to the present invention can be adjusted so as to accommodate different shaped work pieces.

On the other hand, in the event that the work piece has a cross section of the nature indicated by the solid line in FIG. 8 wherein the width of the channel increases from 1a to 1b and the left hand flange fl is located at a lower level than the right hand one fh (viz., the flanges are separated by a vertical distance (d) it is possible to separate the pincers and lower the left hand finger (22) by releasing the hydraulic brake and operating motor 37, to induce the situation illustrated in FIG. 8. In this instance as the pincers are simultaneously moved in opposite directions, each finger need be moved through a distance of 1b-1a/2 thus reducing the time for which motor 29 must be energized. It will of course be obvious that operation of the manipulator on which the pincers are supported may also be required in order to locate the pincers in the appropriate positions. However, as this operation can be carried essentially simultaneously with the movement of the pincers quite rapid resetting of the support arrangement can be achieved. Once the pincers are located in positions wherein the work piece support members 23, 24 engage the work piece in a suitable manner the hydraulic brakes can be reapplied in a manner to ensure that the pincers will not be forced accidentally out of the desired positions.

Figure 9:
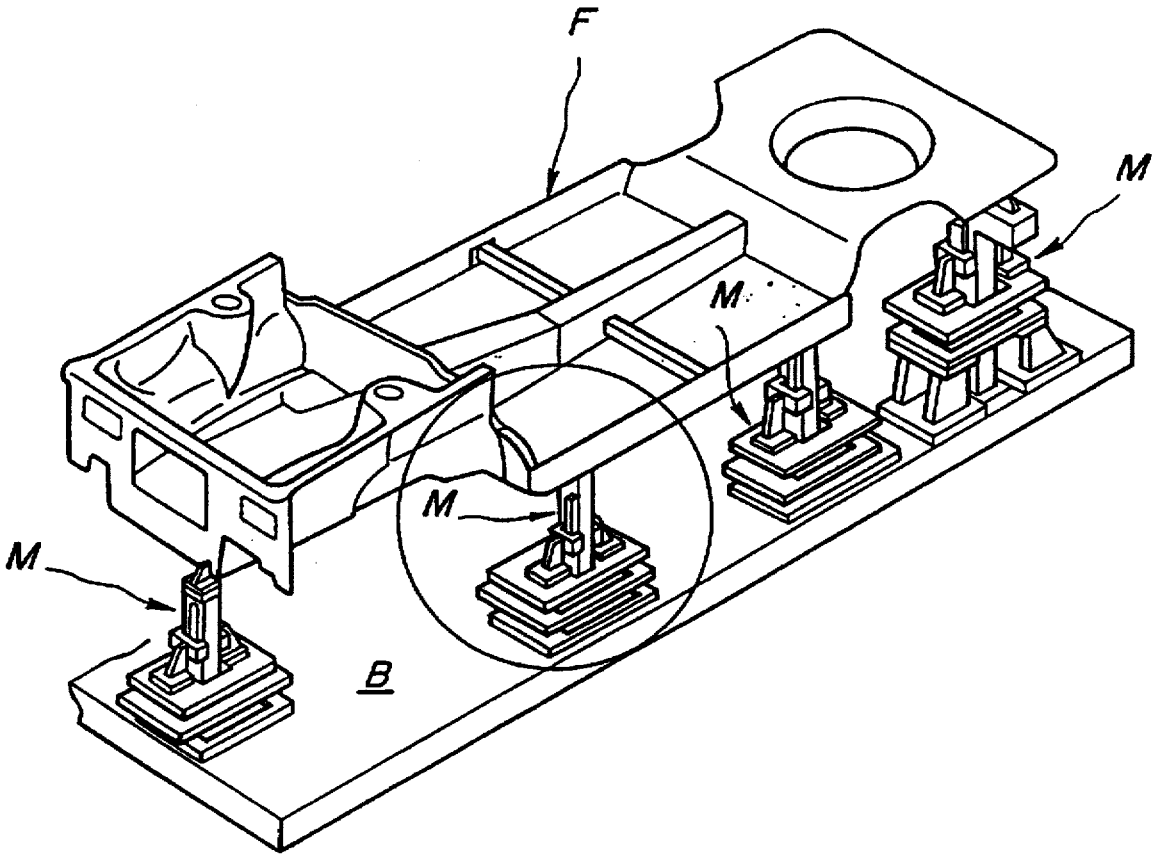
FIG. 9 is a perspective view showing a vehicle chassis supported on manipulators which are equipped with a work support device according to the present invention.
Figure 10:
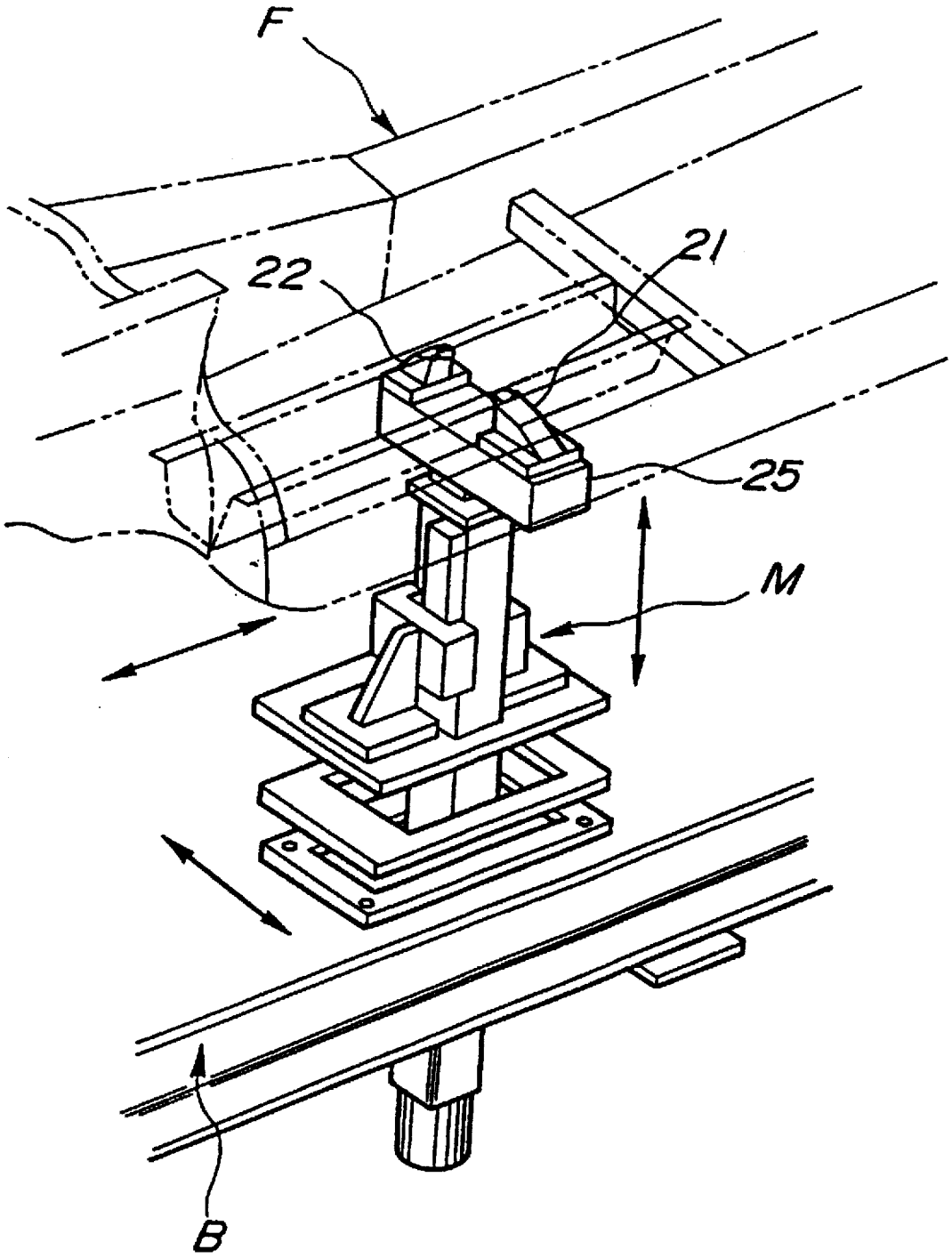
FIG. 10 is a perspective view showing in detail the arrangement of one of the manipulators shown in FIG. 9.

FIGS. 9 and 10 show in schematic form an example wherein the present invention is used to support a vehicle chassis. In this case a number of manipulators M, on which support arrangements according to the present invention, are used. The manipulator circled in FIG. 9 is shown in more detail in FIG. 10. As will be appreciated from FIG. 10 the manipulators are arranged to enable three dimensional positional adjustment with respect to a base member B on which they are mounted. The base member B is not necessarily limited to a stationary structure and be supported on a suitable vehicle if so desired.

Figure 11:
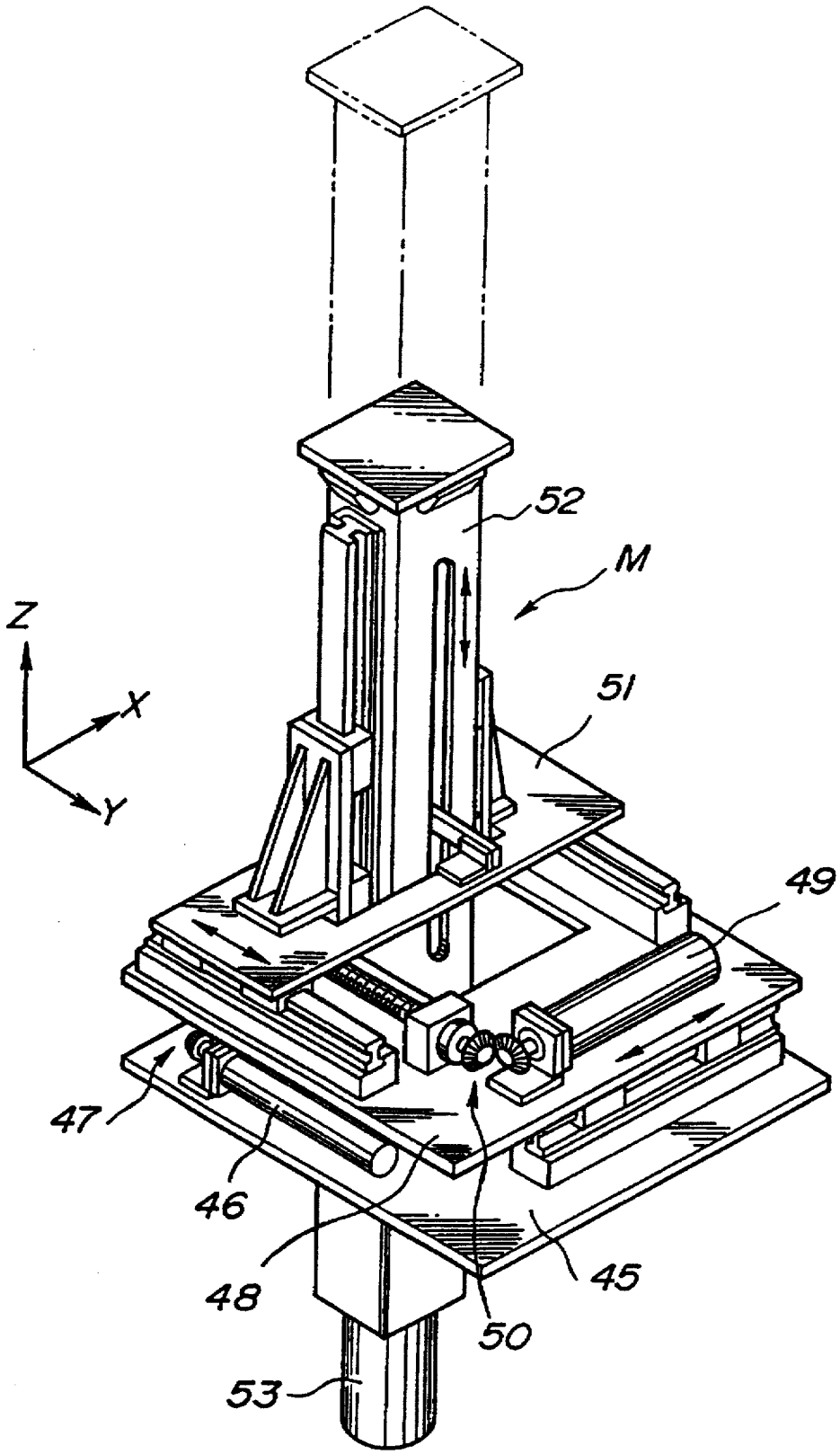
FIG. 11 is a perspective view of showing an example a manipulator which is used in conjunction with the work support arrangements according to the present invention.

FIG. 11 shows the manipulator construction in detail. As will be appreciated from this drawing, the device consists of a base frame 45 which is fixedly connected to the base member B, a first motor 46 which is operatively connected with a movable plate 48 in manner to induce relatively displacement between it and the fixed plate 45 in the X axis direction (viz., in the direction of the arrow extending in said X direction) a second motor 49 which is mounted on the movable plate 48 and operatively connected with a second movable plate 52. In this case the second motor 49 is arranged to induce relatively displacement between the first and second movable plates in the Y axis direction.

A third motor 53 which is located below the level of the fixed plate 45 is operatively connected with a post-like construction 52 of the device in a manner which permits the post to be displaced vertically in the Z axis direction.

As will be appreciated, with above arrangement position adjustment in three dimensions is possible. This, in combination with the readily adjustable support arrangement mounted on top of each manipulator, the plurality of devices which are mounted on the base B can be quickly adjusted in a manner which facilitates highly precise and secure support of a work piece for production and the like. That is to say, work pieces such as vehicle chassis and the like, such as shown in FIG. 9 which exhibit a complex configuration and wherein a large variety of different cross-sections and shapes are encountered, can be easily accommodated with the support arrangement according to the present invention. Further, due to the high flexible nature of the adjustability of the system different chassis which are different in construction and arrangement can also be securely supported.

Figure 12:
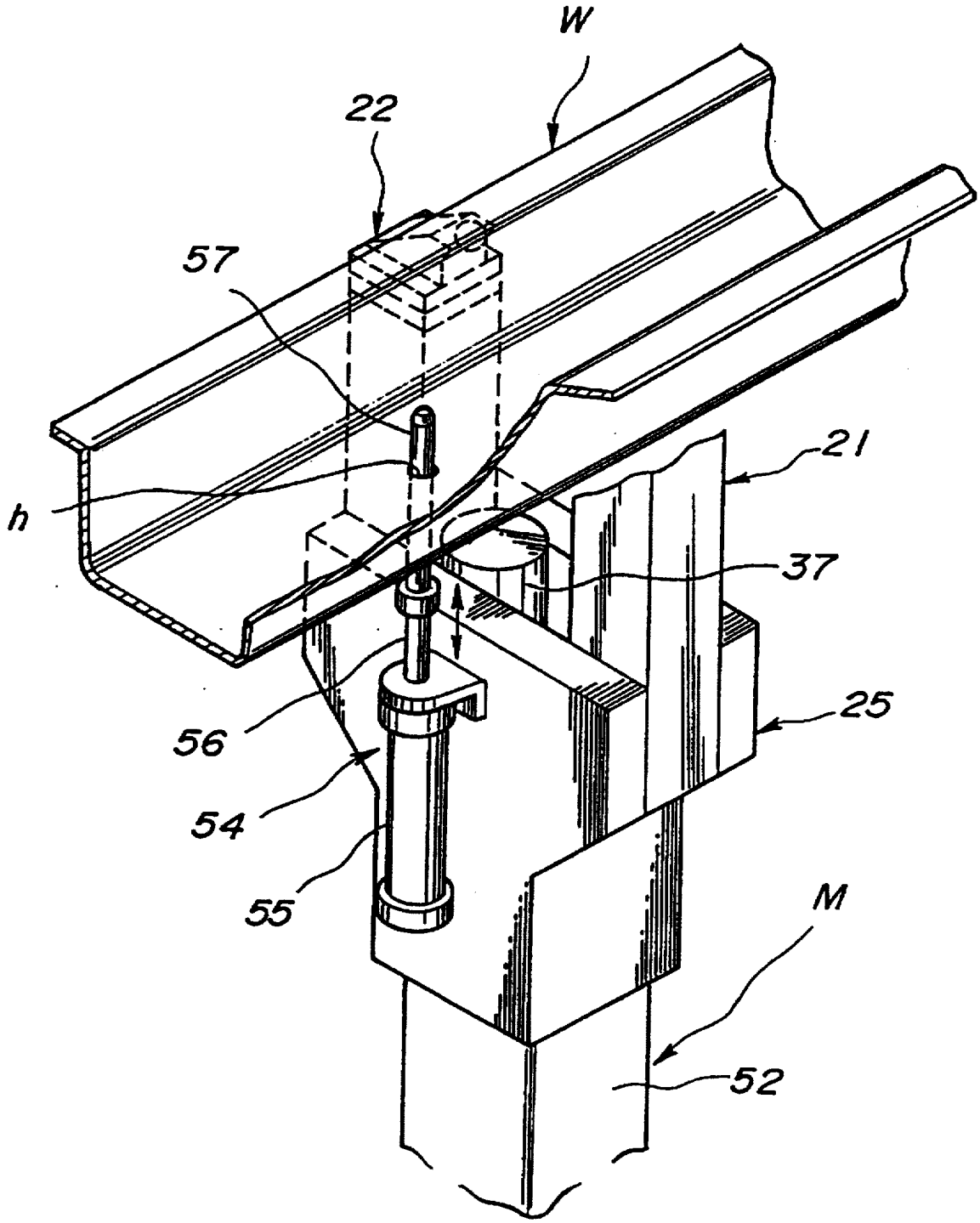
FIG. 12 is a perspective view showing a probe-like member which is arranged to act a locator which ensures that the work piece is secure with precision and which characterizes a second embodiment of the present invention.

FIG. 12 shows a second embodiment of the present invention. This arrangement is essentially identical to the first one and features the addition of a probe like member which can be extended through a preselected or specially provided aperture in a manner which enables the location of the work piece in longitudinal direction. While the first embodiment could assuredly locate the work piece in the vertical and transverse directions there actually may be some slight error in the longitudinal location of the same. With the second embodiment this possibility is eliminated.

In more detail, the second embodiment features the provision of a position locating device generally dentoted by the numeral 54. This device comprises a cylinder 55 which is secured to the frame 25 and which includes a piston rod 56. A location 57 is secured to the upper end of the piston rod and arranged to extend vertically upward in a manner wherein it be inserted through a predetermined aperture or hole h. With this arrangement, when the work piece is located so that the location pin passes through the hole h, it can be assumed that the correct longitudinal location of the work piece with respect to the supporting arrangement has been achieved.

Figure 13:
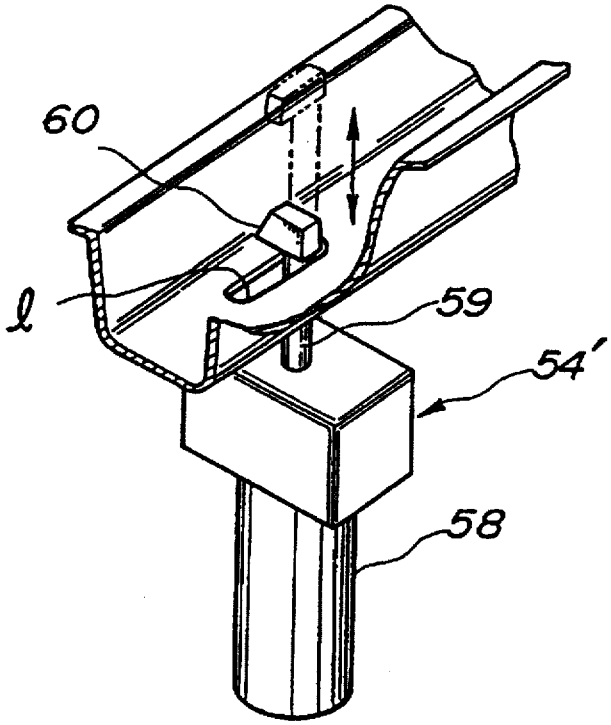
FIGS. 13 and 14 shows a third embodiment of the present invention which features a clamping device for holding the work piece in the required positions.

FIG. 13 shows a third embodiment of the present invention. In this arrangement the chassis or work piece to be supported is formed with an elongate slot or aperture 1 and a locking arrangement provided on the frame 25. In this arrangement the locking arrangement comprises a shaft 59 which is arranged to be vertically displaceable and a hammer head-like pawl member 60 formed on the top of the shaft 59. By way of example only, in the illustrated arrangement the elongate slot is arranged to extend in the longitudinal of the work piece.

Figure 14:
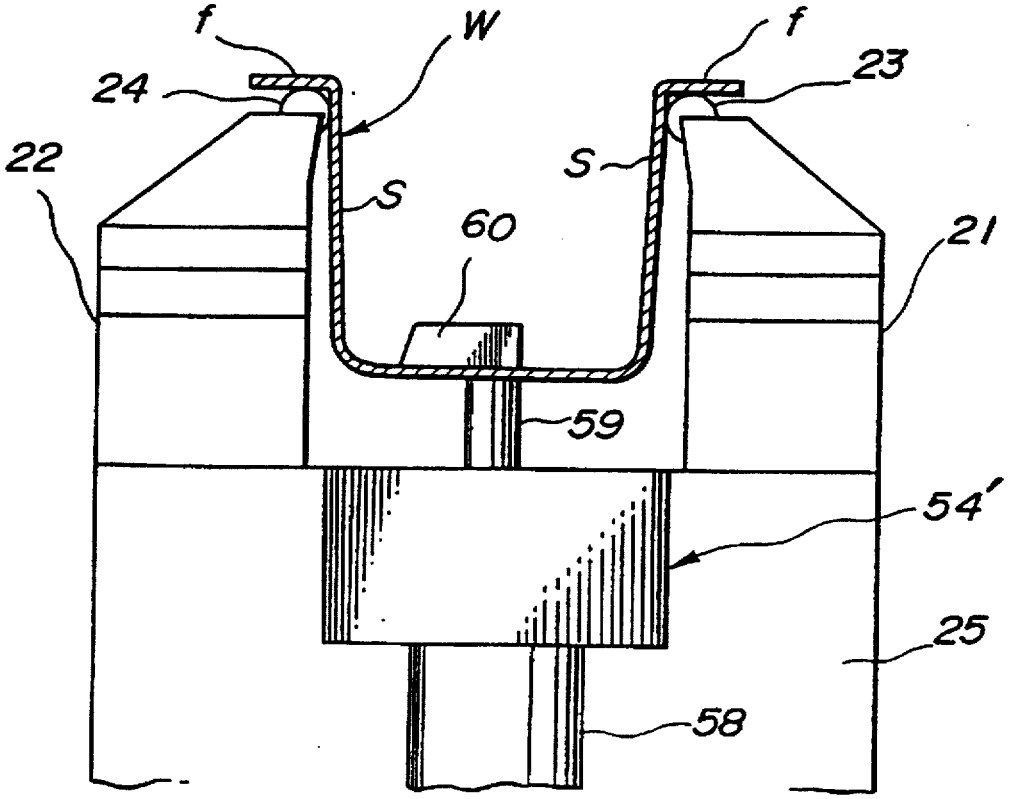

As illustrated in FIGS. 13 and 14, the shaft 59 is operatively connected to a servo device 54'. This servo device includes a swing cylinder which is arranged to selectively rotate the shaft 59 in addition to being able to displace the same in the vertical direction. Accordingly, the shaft 59 can be rotated to a position wherein the locking pawl 60 is oriented in the direction shown in phantom in FIG. 13 and the shaft extend upwardly. After passing through the aperture the shaft can then rotated through 90 degrees and lowered until it assumes the position indicated in solid line in FIGS. 13 and 14. By applying a force which tends to draw the shaft 59 downwardly, the work piece can subject to a force which tends to pull the same down snugly onto the work supporting members 23 and 24 and secure the same against undesirable displacement when work is being done on the work piece.

It will be understood that the third embodiment, like the second one, is essentially the same in construction and arrangement as the first embodiment and differs in that the locking device is additionally provided.

It is of course with the scope of the present invention to combine the locating and locking devices which characterize the second and third embodiments onto the same support arrangement if so desired.

What is claimed is:

1. In a device for supporting a work piece, first and second pincer members, said first and second pincer members being disposed on a base member in a manner to be slidably movable toward and away from each other, said first pincer being elongatable;

first and second work receiving members, said first and second work receiving members being disposed at the upper ends of said first and second pincer members;

first drive means associated with said first and second pincers for moving said first and second pincers toward and away from [one another] *each other*, said first drive means including a device which converts rotational motion into linear motion;

second drive means associated with said first pincer for selectively elongating [the same] *said first pincer*; and a location [device] *means* comprising a probe mounted adjacent said first and second pincers and operatively connected [with] *to* a servo [device to enable the probe to be extended] *extension means for extending said probe* to engage [a location] *with an* aperture formed in [the] *a* work piece supported on said device.

2. In a device for supporting a work piece, first and second pincer members, said first and second pincer members being disposed on a base member in a manner to be slidably movable toward and away from each other, said first pincer being elongatable;

first and second work receiving members, said first and second work receiving members being disposed at the upper ends of said first and second pincer members;

first drive means associated with said first and second pincers for moving said first and second pincers toward and away from [one another] *each other*, said first drive means including a device which converts rotational motion into linear motion; [and]

second drive means associated with said first pincer for selectively elongating [the same] *said first pincer*; and a work piece retention device comprising a probe member having a projection formed thereon, said probe *member* being mounted adjacent said first and second pincers, [and being operatively connected with a servo device to enable it to be selectively extended so as to pass through an aperture in the work piece being supported on said device and then rotated such that when said probe is retracted toward said servo device, the projection engages said work piece and secures the same in] *means for supporting said probe member in an extendable and rotatable manner, means for rotating said probe member to a first angular position and for extending it in said first angular position through an aperture formed in said work piece, and means for rotating said probe member to a second angular posi-*

*tion and for retracting it in said second angular position, so as to engage said projection against the work piece to secure the work piece in a predetermined* position on said device.

*3. A device for supporting a work piece according to claim 1, further comprising:*

*a manipulator for selectively positioning said work piece supporting device, said manipulator comprising:*

*a first base plate, mounted to a base for support thereon;*

*a second plate, located above and arranged essentially parallel with said first plate, said second plate being slideably mounted on said first plate so as to be moveable in first and second opposite directions essentially parallel to a face of said first plate;*

*a third plate, located above and arranged essentially parallel with said second plate, said third plate being slideably mounted on said second plate so as to be moveable in third and fourth opposite directions substantially parallel to a face of said first plate, said third and forth directions extending at right angles with respect to said first and second directions;*

*first, second and third apertures in the central portions of said first, second and third plates, respectively; and*

*an elongated post member, said post member being arranged in a direction normal with respect to the major surfaces of said first, second and third plates and arranged to pass through said first, second and third apertures.*

*4. A device for supporting a work piece according to claim 2 further comprising:*

*a manipulator for selectively positioning said work piece supporting device, said manipulator comprising:*

*a first base plate, mounted to a base for support thereon;*

*a second plate, located above and arranged essentially parallel with said first plate, said second plate being*

*slideably mounted on said first plate so as to be moveable in first and second opposite directions essentially parallel to said first plate;*

*a first motor, mounted on said first plate so as to be located between said first and second plates, said first motor being operatively connected with said second plate by way of a first drive connection, said first motor being selectively energizable to drive said second plate in a selected one of said first and second directions;*

*a third plate, located above and arranged substantially parallel with said second plate, said third plate being slideably mounted on said second plate so as to be moveable in third and fourth opposite directions substantially parallel with respect to said first plate, said third and fourth directions extending at right angles with respect to said first and second directions;*

*a second motor, mounted on said second plate so as to be located between said second and third plates, said second motor being operatively connected with said third plate by a second drive connection, said second motor being selectively energizable to drive said third plate in a selected one of said third and fourth directions; first, second and third apertures in the central portions of said first, second and third plates respectively; and*

*an elongated post member, arranged in a direction normal with respect to the major surfaces of said first, second and third plates and arranged to pass through said first, second and third apertures, said post member being slideably supported by said third plate; and a third motor, said third motor being located at the bottom of said post member.*

* * * * *